United States Patent [19]

Bolton et al.

[11] 4,188,078

[45] Feb. 12, 1980

[54] BEARING LUBRICATION SYSTEM FOR BOWED ROLLS

[75] Inventors: Joseph A. Bolton, Glens Falls; William Hoover, Hudson Falls, both of N.Y.

[73] Assignee: Albany International Corp., Albany, N.Y.

[21] Appl. No.: 909,201

[22] Filed: May 25, 1978

[51] Int. Cl.² .................................. F16C 33/76
[52] U.S. Cl. .................................. 308/187; 193/37; 308/20; 308/189 R
[58] Field of Search ............ 308/20, 187, 189 R, 308/DIG. 15, 77, 76; 198/192 A, 780; 193/37

[56] References Cited

U.S. PATENT DOCUMENTS

| 2,664,173 | 12/1953 | Karig | 308/76 X |
| 3,918,774 | 11/1975 | Nicholson | 308/187 |
| 3,951,480 | 4/1976 | Nicholson | 308/187 |

Primary Examiner—Douglas C. Butler
Attorney, Agent, or Firm—Kane, Dalsimer, Kane, Sullivan & Kurucz

[57] ABSTRACT

A bowed roll lubrication system for a bowed roll of the type having an elongated shaft and a plurality of spools disposed about the shaft for rotation. A plurality of ball bearings are disposed along the shaft and each of the bearings has an inner race in contact with the shaft and an outer race in contact with one of the spools. A through passageway extends between the races and cooperates with the races in defining a ball chamber. The lubricant system is designed to provide lubricant to the interior of the ball chambers and includes a lubricant reservoir and a lubricant line extending between the reservoir and the interior of the roll so that the lubricant may be interjected to the interior of the roll at a predetermined location. The interjected lubricant is then directed through the ball chambers in a desired pattern.

9 Claims, 3 Drawing Figures

BEARING LUBRICATION SYSTEM FOR BOWED ROLLS

BACKGROUND OF THE INVENTION

Various types of bowed rolls are extensively used in the paper and textile industries, as for example, in the structures with which these materials are handled and moved. The rolls comprise a curved sleeve supported by a series of spools which, in turn, are supported by bearings to rotate about a shaft. An example of the general type of system under consideration is in U.S. Pat. No. 3,918,774.

It is essential to the proper operation of the rolls that the bearings be constantly lubricated to insure proper operation. It is particularly useful to provide a system which enables lubrication to occur without any slowing down or stoppage of the equipment. An example of one such lubrication system is in U.S. Pat. No. 3,951,480.

When dealing with high speed bowed roll systems in difficult environments such as in the wet end of the paper machine and also the need for continued lubrication for reliability and long operating life time, improved lubrication systems which operate in an efficient and effective manner under such conditions are extremely desirable. This is particularly true when high speeds are involved, such as 4500 FPM or higher.

SUMMARY OF THE INVENTION

With the above background in mind, it is among the primary objectives of the present invention to provide a lubrication system for a bowed roll of the type having an elongated shaft, a plurality of spools disposed about said shaft for rotation and a plurality of ball bearings disposed along the shaft. Each of the bearings has an inner race in contact with the shaft and an outer race in contact with one of the spools and a through passageway extending between the races and cooperating with the races in defining a ball chamber. The lubricant system for providing the lubricant to the interior of the chamber includes a lubricant reservoir and a lubricant line extending between the reservoir and the interior of the roll so that lubricant may be interjected to the interior of the roll at a predetermined location. Means for directing the lubricant interjected from the line into communication with the ball chambers in a desired pattern is provided as well.

In the present system it is an objective to provide a means for pumping a lubricant such as oil from a reservoir through a heat exchanger, filtering the lubricant and then feeding to the interior of a sealed bowed roll. Both ends of the roll are sealed with mechanical seals to prevent lubricant from leaking out of the roll. It is contemplated that the ends seals can be lubricated with water to prevent excessive heat buildup within the mechanical seals. The lubricant is pumped to the center of the roll and flows toward both ends through the use of pumping vanes within the roll. Scavenger pumps are used to extract the lubricant from the roll for recycle to the reservoir.

The pumping vanes are in the form of opposing turbine vanes at 180° intervals within the roll to pick up the film of lubricant produced by the rotation of the outer sleeve and to pump it through the bearing where it will mist lubricate the bearing and then provide a film on the next spool where it would be pumped through the next bearing.

It is an objective to inject the oil into the center of the roll and by pumping of the turbine vanes transport the lubricant to both ends of the roll where it is scavenged back to the reservoir by at least one pump to be cooled if required, filtered and pumped back to the center of the roll.

The roll is designed to be sealed at both ends by either a single or double mechanical seal for reliability. With use of the double seal, cooling water is pumped into the area between the two sealed faces.

In summary, a positive lubrication system is provided for a plurality of bearings within a high speed roll.

With the above objectives among others in mind, reference is made to the attached drawings.

DETAILED DESCRIPTION

Figure 1:
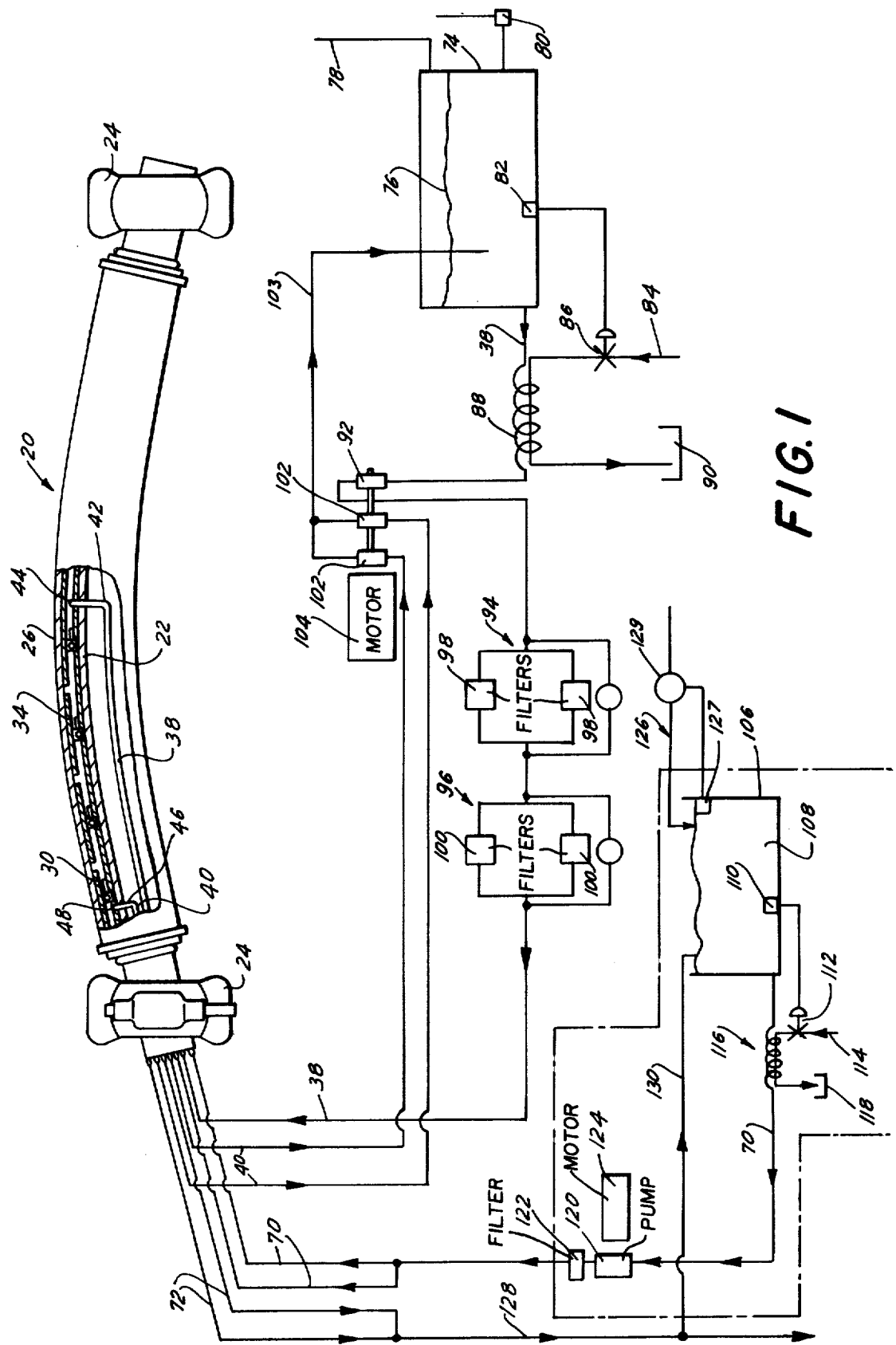
FIG. 1 is a schematic view of the bowed roll lubrication system of the invention.

Bowed roll 20 is depicted in FIG. 1 in schematic relationship with the lubrication system of the invention incorporated therewith. It is a typical type of bowed roll as commonly used in the textile and paper industries and as considered in the above referenced patents.

Each roll 20 includes a curved shaft 22 supported at its ends by journal supports 24. A sleeve 26 substantially coextensive with the shaft 22 is disposed about the shaft and held in position at each end by an end cap 28 which, in turn, is supported for rotation with spool 30 which is keyed to the cap. A screw 32 is convenient for mounting each end cap 28 to an adjacent end spool 30. A plurality of additional spools 34 are spaced along the shaft between the end spools 30 with each of the spools being supported by a bearing 36.

In operation, traveling textile or paper passes over the sleeve causing the sleeve and hence the spool to rotated about the shaft.

In the depicted embodiment, shaft 22 is hollow and disposed within the hollow shaft 22 is a lubrication inlet line 38 and a pair of lubrication outlet lines 40. One of the outlet lines 40 is disposed at one end of the shaft 22 and the other outlet line is disposed at the other end of the hollow shaft 22. Inlet line 38 has an end portion 42 mounted approximately in the center of shaft 22 and extending through the shaft to terminate in an opening 44 which is open to the space between the outer surface of shaft 22 and the inner surface of the spools. In this position, it is in direct communication with the plurality of bearings 36 for each spool spaces along the length of the roll 20. Similarly, each line 40 has an end portion 46 extending through shaft 22 with an opening 48 in communication with the space between the outer surface of shaft 22 and the inner surface of the spools and in communication with the adjacent end bearing.

Figure 2A:
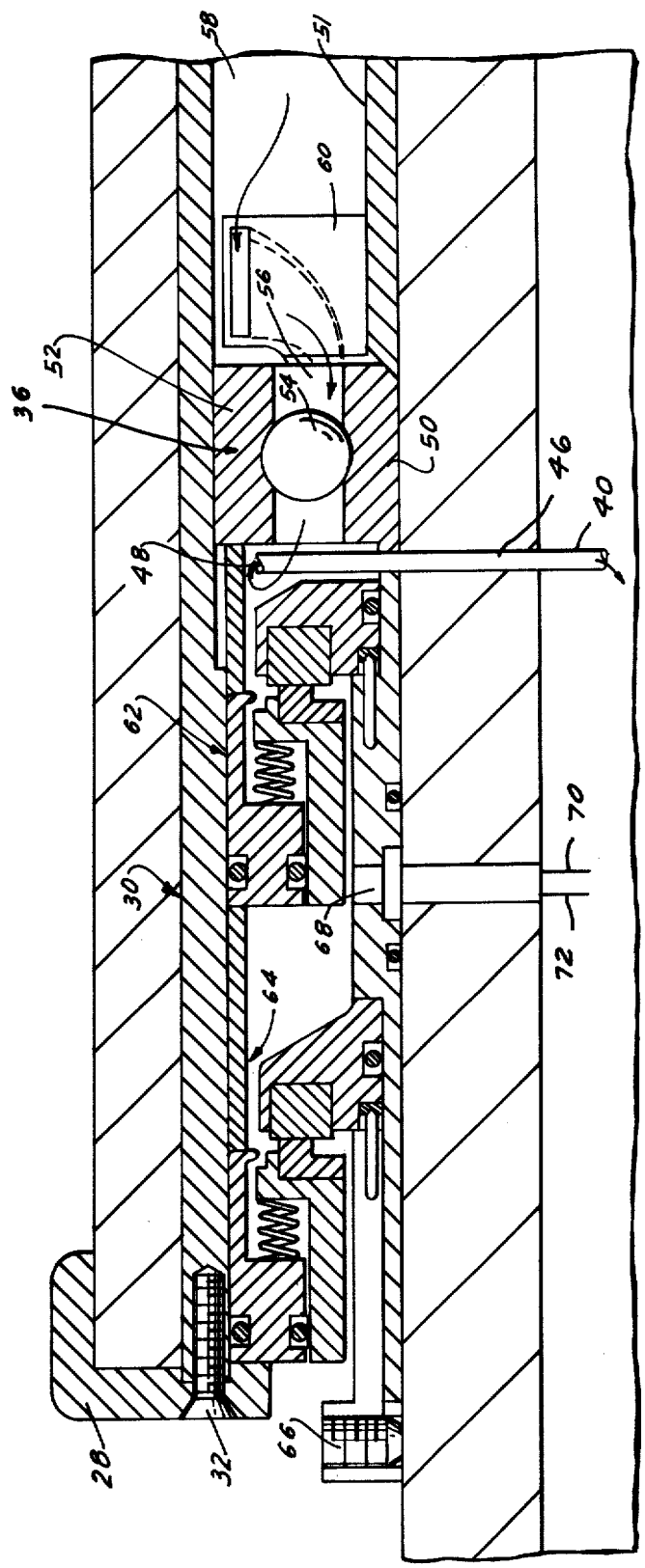
FIG. 2a is an enlarged fragmentary sectional view of the bowed roll portion thereof showing one end portion of the bowed roll with arrows depicting the direction of flow of lubricant at an end of the bowed roll.
Figure 2B:
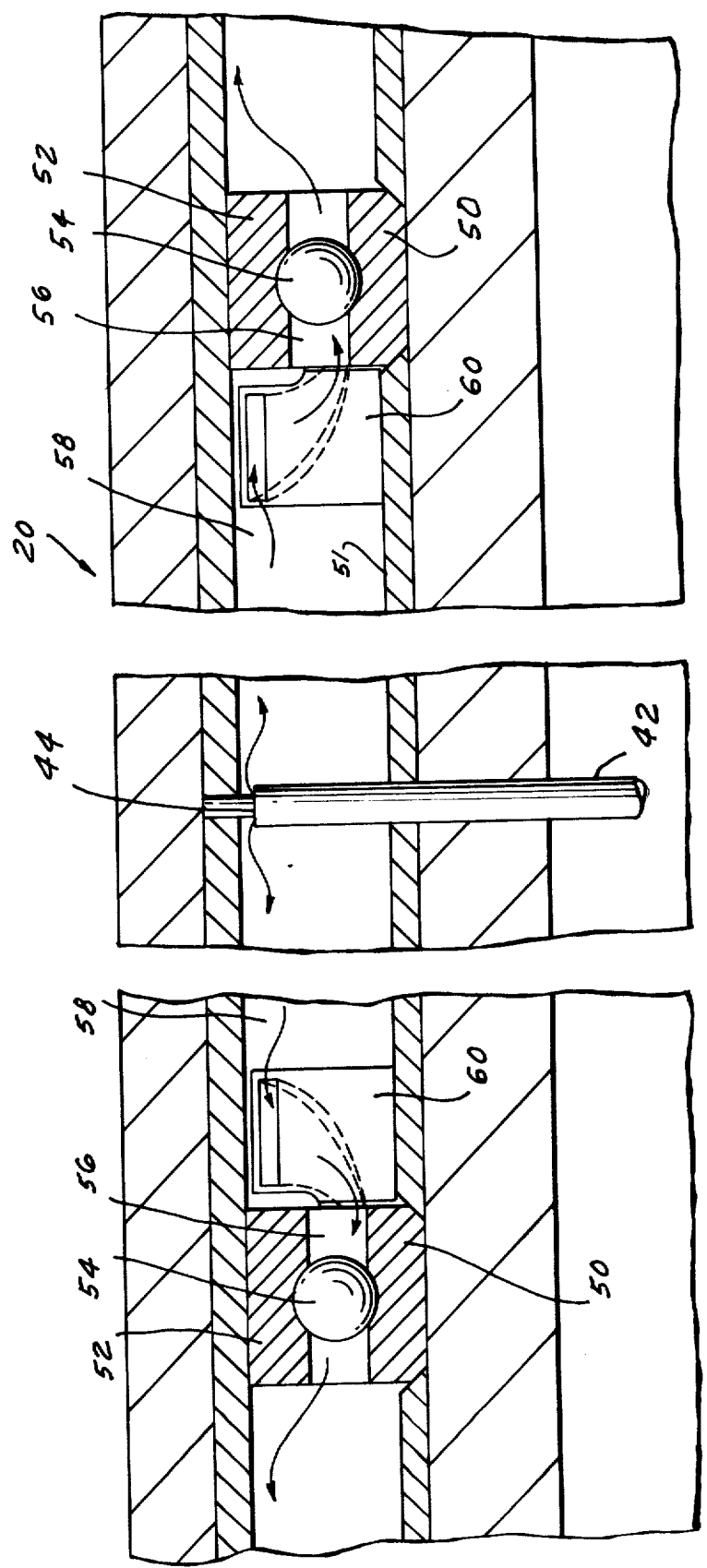
FIG. 2b is a fragmentary enlarged sectional view of the central portion of the bowed roll of the invention.

As shown in FIGS. 2a and 2b, each bearing 36 includes an inner race 50 securely fitted about shaft 22 and an outer race 52 fitted to the inside of a spool 30 or 34. A bearing spacer 51 is used to lock the bearing in place and to provide good clearance between the inner race 50 and the outer diameter of the shaft. A plurality of balls 54 are conventionally housed between races 50 and 52 and held in fixed communication therebetween.

Each bearing 36 has a passageway 56 therethrough for flow of lubricant as shown by the arrows in FIGS. 2a and 2b, the lubricant flowing through the space 58 between the outer surface of bearing spacer 51 and the inner surface of the spools. The spools rotate with respect to the shaft 22 and accordingly outer races 52 rotate about balls 54 during operation of the roll 20. The turbine vanes 60 are attached to the stationary bearing spacers 51. They can be spaced conveniently, for example, at 180° intervals. The turbine vanes 60 serve to direct the lubricant passing through space 58 through the bearings 36 as the lubricant flows from the center of the roll 20 to the ends thereof.

As shown in FIG. 2a each end of roll 20 is sealed by a double mechanical seal arrangement to assure reclamation of the lubrication material as it reaches the end of the rolls. Inner mechanical seal 62 is identical to outer mechanical seal 64 with appropriate resilient cam surfaces accomplishing the sealing action and the end cap 28 engaging with outer seal assembly 64 to hold the seal in position with the assistance of set screw 32. A vertically positioned set screw 66 is also located at each end to mount the outer seal to shaft 22 and the outer seal in turn holds the inner seal assembly 62 in position. A combined outlet and inlet passageway 68 is provided between seals 1 and 2 for passage of water to act as a coolant pumped between the two seal faces to prevent over heating as the bowed roll operates. Passageway 68 communicates with an inlet tube 70 and an outlet tube 72 at each end of roll 20. The inlet tube 70 and the outlet tube 72 are 180° apart. The lines 70 and 72 pass through the hollow interior of hollow shaft 20 as depicted in FIG. 1.

The remainder of the lubrication system as depicted in schematic form in FIG. 1 includes a reservoir 74 containing a supply of lubricant 76, for example oil. The reservoir 74 is of a conventional type with an instrument air purge inlet 78 provided as a control along with a low level alarm switch 80 connected between the reservoir and an indicator panel. A thermocouple 82 is mounted in the base of the reservoir and connected at the other end to a feed-in water line 84 through an appropriate valve assembly 86. The feed-in water line, used as a coolant, passes through a conventional water or air cooled heat exchanger 88 and then exits through a conventional drain 90. The oil from the reservoir passes into the beginning of feed line 38 which extends through the heat exchanger for cooling the oil to the desired temperature and a pump 92 in line 38 pumps the oil through a pair of filter assemblies 94 and 96. Assembly 94 includes a pair of particulate filters 98 in parallel relationship and the second filter assembly 96 includes a pair of coalescing filters 100 in parallel relationship. After this filtering activity, the lubricant is ready to continue through line 38 and enter the bowed roller through the opening 44 in the end of the inlet line.

When the lubricant exits from the ends of the bowed roll through outlet lines 40, each outlet line 40 includes a scavenger pump 102 for pumping the return lubricant and combining the lubricant through a return line 103 for discharge into reservoir 74. A conventional motor 104 drives the scavenger pumps 102 and feed pump 92.

The water cooling system for the end seals 62 and 64 includes a reservoir 106 containing water 108 with a thermocouple 110 in the base of the reservoir connected by valves 112 to a water inlet feed 114. The water inlet feed 114 passes through a heat exchanger 116, as a coolant, and exits into a drain 118. The water from reservoir 106 is cooled as it passes through heat exchange 116 and then continues through feed line 70 under the drive of pump 120 through filter 122 and into the space in bowed roll 20 containing the seals 62 and 64. Motor 124 is used to drive pump 120. An additional fresh water supply 126 with an appropriate level control system including sensor 127 and interconnected automatically controlled valve 129 is used to supplement the water received through lines 70 from reservoir 106. This becomes necessary because the water exiting through outlet lines 72 in the end seals is partially disposed of through line 128 while the remainder is directed through line 130 back into reservoir 106. The recirculatory cooling system for the end seals is generally only found to be necessary when the double end seals 62 and 64 are employed as depicted. Alternatively, a single mechanical end seal can be used at each end of the roll in which case the water cooling system is generally not required.

In operation, sleeve 26 and spools 30 and 34 rotate along with outer races 52 about the fixed portion of the roller which includes inner shaft 22 and inner races 50. The vanes 60 are stationary and are attached to the bearing spacer 51. The balls 54 provide the bearing surfaces for the relative rotation. As the rotation occurs, lubricant 76 is fed through line 38 where it is cooled by heat exchanger 88 and then pumped through filter assemblies 94 and 96 and into the hollow interior of shaft 22 through line 38. The lubricant exits from line 38 through opening 44 into the space 58 between the outer surface of shaft 22 and the inner surface of the spools. Stationary vanes 60 adjacent to outlet opening 42 at the center of the shaft then directs the oil through the bearings as shown by the arrows in FIG. 3. In the depicted embodiment, there are two turbine vanes 60 for each bearing assembly and they are positioned at 180° intervals where they can pick up the film of oil created by the rotation of the outer portions of the assembly with respect to the inner portions and blow it through opening 56 between the races of the bearing where mist lubricates the bearing and then exits through the other end of through passageway 56 in the bearing to provide a film adjacent the next spool in the direction toward the ends of the roll 20. Lubricant is moving in both directions from inlet opening 44 toward the opposing ends. In a similar manner at the next spool, similar turbine vanes 60 blow the oil through the next bearing. This action continues until the lubricant reaches the ends of the bowed roll. In this manner, the lubricant is injected in the center of the roll and by the pumping action of the turbine vane 60 is transported to both ends of the roll 20 where it's scavenged back through the openings 48 in the end portion 46 of each outlet tube 40. This scavenging action is accomplished by the action of pumps 102 in the return lines 40. The lubricant is then directed through a common return line 103 to the reservoir 74 for cooling, if required, filtering and pumping back to the center of the roll for reuse.

As discussed above, roll 29 is sealed on both ends by either a single or double mechanical seal with the double seal, as shown, cooling water is pumped during operation of the roll 20 from reservoir 106 through feed lines 70 into the area between the two seal faces at the ends of the roll.

Pumping can be continuous even while roll 20 is in operation so that no shut down or interruption of work is necessary in order to keep the roll properly lubricated. Also, while a hollow shaft is depicted in the embodiment, it is also possible to have the lubricating and cooling lines extending along the surfaces of a solid shaft.

Alternatively, the roll can be straight instead of bowed.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim:

1. In a roll of the type having an elongated shaft, a plurality of spools dispersed about said shaft for rotation and a plurality of ball bearings disposed along said shaft, each of said bearings having an inner race in contact with said shaft, an outer race in contact with one of said spools and a through passageway between said races and cooperating with said races in defining a ball chamber, the improvement comprising; a recirculatory lubricant system for providing lubricant to the interior of said ball chambers including a lubricant reservoir, a lubricant line extending between said reservoir and the interior of the roll so that lubricant may be interjected to the interior of the roll at a predetermined location, and means for directing the lubricant interjected from the line into communication with the ball chambers in a desired pattern.

2. The invention in accordance with claim 1 wherein a line is extended to the center portion of the roll so that a lubricant interjected therefrom flows toward both ends of the roll being directed sequentially through the ball chambers disposed along the shaft.

3. The invention in accordance with claim 1 wherein the roll is sealed at both ends to form end seals to prevent lubricant from leaking out of the roll and water from leaking in.

4. The invention in accordance with claim 3 wherein the end seals are mechanical seals and the mechanical end seals are lubricated by a second separate lubrication system to prevent excessive heat build-up within the mechanical seals.

5. The invention in accordance with claim 1 wherein cooling means is provided to cool the lubricant and filtering means is provided to filter the lubricant before interjecting the lubricant into the interior of the roll.

6. The invention in accordance with claim 1 wherein the shaft is hollow and the lubricant line extends through said hollow shaft.

7. In a roll of the type having an elongated shaft, a plurality of spools dispersed about said shaft for rotation and a plurality of ball bearings disposed along said shaft, each of said bearings having an inner race in contact with said shaft, an outer race in contact with one of said spools and a through passageway between said races and cooperating with said races in defining a ball chamber, the improvement comprising; a lubricant system for providing lubricant to the interior of said ball chambers including a lubricant reservoir, a lubricant line extending between said reservoir and the interior of the roll so that lubricant may be interjected to the interior of the roll at a predetermined location, means for directing the lubricant interjected from the line into communication with the ball chambers in a desired pattern, the means for directing the lubricant interjected from the line into communication with the ball chambers includes an arrangement of pumping turbine vanes in the roll to pick up the film of lubricant provided by the rotation of the spools with respect to the shaft to pump it through a bearing chamber where it would mist lubricate the bearing and then create a film on an adjacent spool where it would be pumped through the next bearing in sequence until the lubricant reaches the ends of the roll.

8. The invention in accordance with claim 7 wherein a return line is provided at both ends of the roll to receive the lubricant transported to the ends of the roll by the turbine vanes, the return lines extending to the reservoir, and means for returning the lubricant to the reservoir for reuse.

9. The invention in accordance with claim 7 wherein a pair of turbine vanes are mounted at 180° intervals about the diameter of the roll adjacent to each bearing chamber.

* * * * *